UNITED STATES PATENT OFFICE.

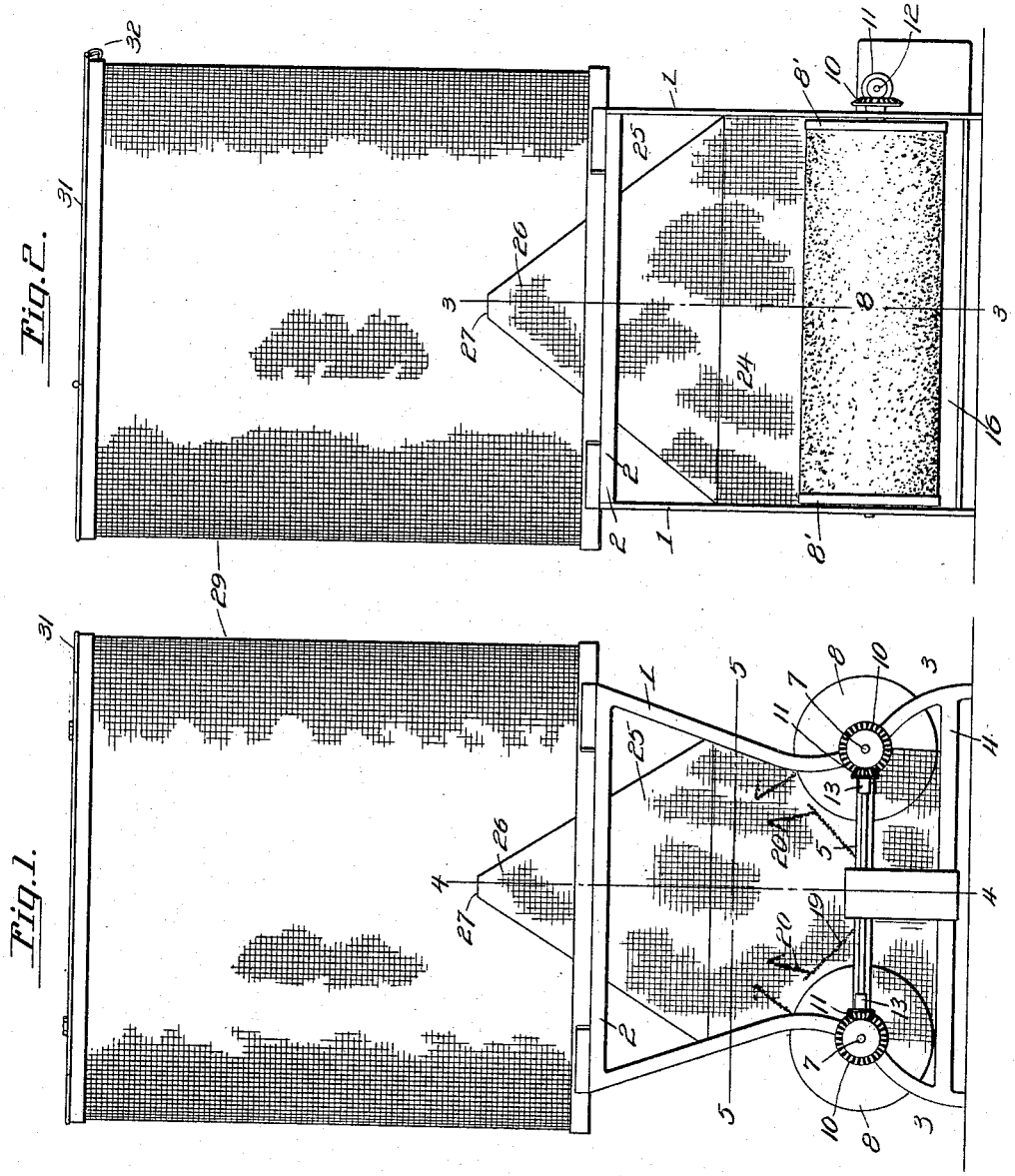

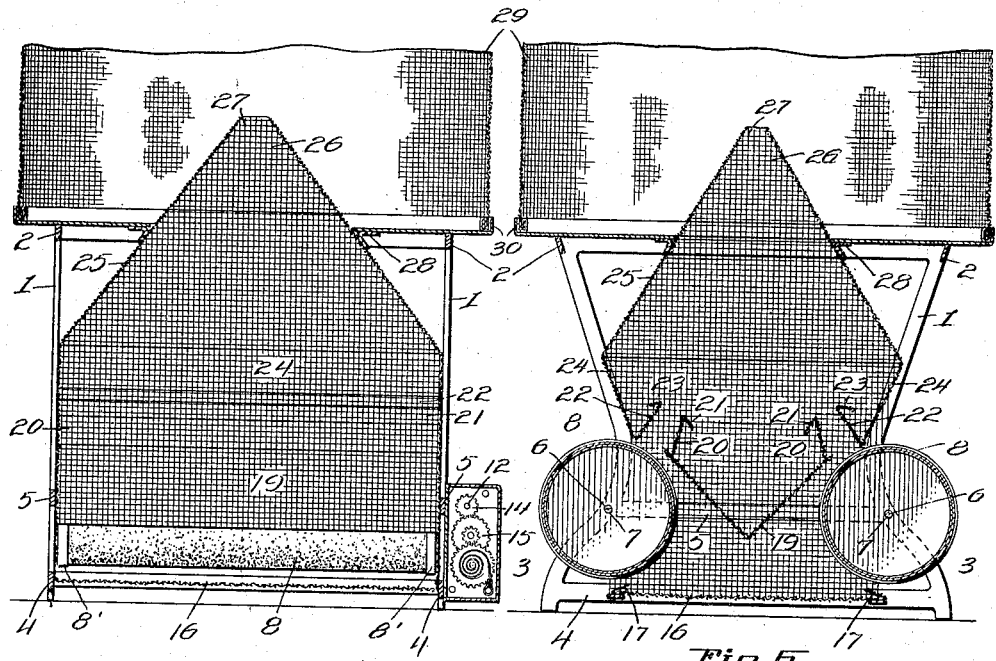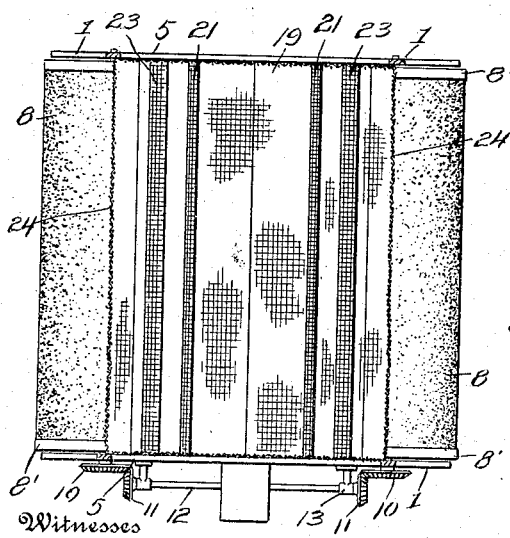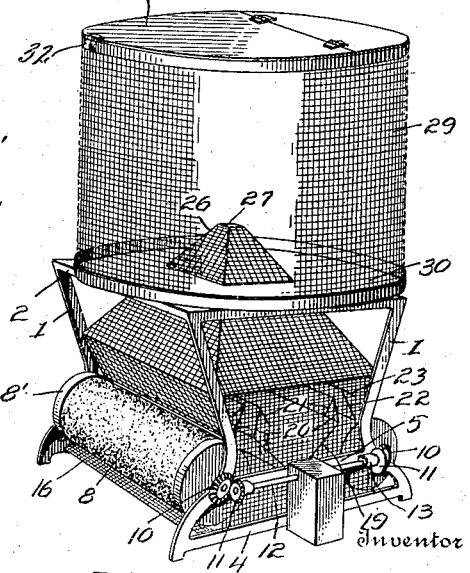

JOHN A. HOPKINS, JR., OF BURNS, KANSAS.

INSECT-TRAP.

1,204,770.  Specification of Letters Patent.  Patented Nov. 14, 1916.

Application filed March 9, 1915. Serial No. 13,262.

*To all whom it may concern:*

Be it known that I, JOHN A. HOPKINS, Jr., a citizen of the United States, residing at Burns, R. F. D., in the county of Butler and State of Kansas, have invented new and useful Improvements in Insect-Traps, of which the following is a specification.

The present invention relates to insect traps, and the object of the invention is to provide a trap which shall be of a simple construction, which shall act automatically to deliver the insects to the trap and which will perform the function for which it is designed with accuracy and with surety.

With the above and other objects in view, the improvement resides in the construction, combination and arrangement of parts set forth in the following specification and falling within the scope of the appended claim.

In the drawings: Figure 1 is a side elevation of an insect trap constructed in accordance with the present invention, Fig. 2 is a front elevation of the same, Fig. 3 is a transverse sectional view approximately on the line 3—3 of Fig. 2, Fig. 4 is a similar sectional view approximately on the line 4—4 of Fig. 1, Fig. 5 is a horizontal sectional view on the line 5—5 of Fig. 1, and Fig. 6 is a perspective view of the trap, the dome being reduced.

In carrying out my invention it is my purpose to provide a trap which is operated by a suitable motor and which comprises a pair of oppositely disposed rollers having suitable bait thereon which attracts the flies or other insects and which shall be operated in opposite directions at the same momentum to bring the insects above the lower portion of the trap to cause the same to fly upwardly from the open bottom of the trap to a cage arranged for their reception, or whereby dead flies may be scraped from the roller and deposited in a pan arranged below the said rollers and adapted to receive the said flies.

As illustrated in the drawing the trap includes a skeleton frame, the same including spaced side members 1—1 formed adjacent their upper and lower edges with connecting members 2, the said connecting members securing all of the side or leg members 1, so that the frame is of a substantially rectangular formation. The legs 1, at the lower ends thereof are preferably inclined outwardly, and the sides of the trap which for distinction are indicated by the numerals 3, are provided with lower connecting members 4 and 5 respectively. The legs 1 at the juncture of the connecting members 5 are provided with openings 6 receiving the trunnions 7 of rollers 8, and these rollers are preferably formed of tubular members constructed of sheets of asbestos having end disks 8' upon which the trunnions 7 are formed. Between the members 4 and 5 upon one of the sides 3 of the device is arranged a suitable motor which may be arranged in the nature of an electric motor, a weight member or a spring member, and the trunnions 7 of the rollers 8 are provided each with cog wheels 10. These wheels 10 are adapted to intermesh with small toothed wheels 11 provided upon a transverse shaft 12, the said shaft being arranged in suitable bearings 13 and being approximately centrally provided with a toothed wheel 14 which meshes with a similar toothed wheel 15 that is connected with the motor and provides the drive wheel thereof. The arrangement of the intermeshing toothed wheels is such that the rollers are rotated slowly so that insects being attracted by the bait upon the said rollers will not be disturbed or frightened by the rotation of the rollers. Secured upon the frame, between the legs 1 thereof is a pan 16, having inwardly inclined flanged edges 17 and the said pan may frictionally engage with the legs 1, or may be otherwise secured in an adjusted position with relation to the frame. Arranged longitudinally between the rollers 8 and secured to the side members of the frame of the device is a substantially V-shaped reticulated member 19, the inclined sides of the said member being directed toward the opposite or adjacent faces of the rollers 8 and terminating only a slight distance from the said rollers. The inclined faces of the members 19, adjacent the outer edges thereof have arranged thereon substantially right angular members 20, the flanged portions 21 of which being inclined toward each other and the members 20 are disposed a suitable distance beyond the ends or edges of the sides of the member 19. Secured to the frame and extending inwardly thereof and at an angle to the members 20 are reticulated directing members 22, the same having their upper edges provided with outwardly extending inclined flanges 23, and the members 22 and 23 may and preferably do comprise the lower portions of the sides 24 of what I will term a dome 25. This dome has its upper portion 26 of a frusto-conical shape, thus providing the same with a central opening 27, and the said dome is provided with an annular metallic flange 28 which is arranged substantially parallel with the upper edges of the frame.

The numeral 29 designates the reticulated tubular cage for the device, the same having its lower end provided with an opening to receive the frusto-conical end of the dome 25, and the said opening being provided with a flange 30 which engages with the flange 28 of the said dome 25. Suitable means are provided for securing the flanges of the cage to the flange 28 of the dome, and the upper and outer end of the cage is formed with a door 31 which is normally closed through the medium of a latch 32.

From the above description, taken in connection with the accompanying drawings, the simplicity of the device, as well as the advantages thereof will, it is thought, be perfectly apparent to those skilled in the art to which such invention appertains without further detail description.

Having thus described the invention, what I claim is:—

An insect trap comprising a suitable supporting frame, an angular reticulated member disposed within the frame and having a pyramidal upper portion formed with an opening in the apex thereof, a cage disposed on the frame and provided with an opening receiving the upper end of the pyramidal portion, the lower portions of the two opposite sides of the angular member being directed upwardly and inwardly at acute angles, the upper ends of said portions being directed downwardly and outwardly to form guard or baffle flanges, motor driven rollers mounted below the said sides of the angular member, and a downwardly directed V-shaped trough disposed between the rollers and having its upper marginal edges directed upwardly in spaced relation to the first named upwardly directed portions and thence downwardly at acute angles to form guard or baffle flanges.

In testimony whereof I affix my signature in presence of two witnesses.

JOHN A. HOPKINS, Jr.

Witnesses:
J. O. LIUTUER,
P. A. KRONSELMAN.

Copies of this patent may be obtained for five cents each, by addressing the "Commissioner of Patents, Washington, D. C."